US008395762B2

(12) United States Patent
Hirano et al.

(10) Patent No.: US 8,395,762 B2
(45) Date of Patent: *Mar. 12, 2013

(54) APPARATUS AND METHOD FOR MEASURING CHROMATIC DISPERSION

(75) Inventors: Masaaki Hirano, Yokohama (JP); Toshiki Taru, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 533 days.

This patent is subject to a terminal disclaimer.

(21) Appl. No.: 12/647,267

(22) Filed: Dec. 24, 2009

(65) Prior Publication Data

US 2010/0165328 A1 Jul. 1, 2010

(30) Foreign Application Priority Data

Dec. 25, 2008 (JP) ................................. 2008-331242

(51) Int. Cl.
*G01N 21/00* (2006.01)
*H04B 10/08* (2006.01)
*H04B 17/00* (2006.01)

(52) U.S. Cl. ........................................ 356/73.1; 398/29
(58) Field of Classification Search .................. None
See application file for complete search history.

(56) References Cited

U.S. PATENT DOCUMENTS

| | | | | |
|---|---|---|---|---|
| 5,619,320 | A * | 4/1997 | Eiselt et al. .................. | 356/73.1 |
| 5,956,131 | A * | 9/1999 | Mamyshev et al. .......... | 356/73.1 |
| 6,118,523 | A * | 9/2000 | Brener et al. ................. | 356/73.1 |
| 6,154,273 | A * | 11/2000 | Suzuki .......................... | 356/73.1 |
| 6,522,818 | B1 * | 2/2003 | Aso et al. ...................... | 385/122 |
| 7,146,085 | B2 | 12/2006 | Tadakuma et al. | |
| 2003/0137653 | A1 * | 7/2003 | Kawabata .................... | 356/73.1 |
| 2007/0035722 | A1 * | 2/2007 | Tadakuma et al. ........... | 356/73.1 |
| 2009/0079967 | A1 * | 3/2009 | Radic ........................... | 356/73.1 |
| 2010/0209101 | A1 * | 8/2010 | Hirano et al. ................. | 398/29 |

OTHER PUBLICATIONS

Cohen, L., et al., "A Universal Fiber-Optic (UFO) Measurement System Based on a Near-IR Fiber Raman Laser", IEEE Journal of Quantum Electronics, Nov. 1978, pp. 855-859, vol. QE-14 No. 11, IEEE.

Costa, B., et al., "Phase Shift Technique for the Measurement of Chromatic Dispersion in Optical Fibers Using LED's", IEEE Journal of Quantum Electronics, Oct. 1982, pp. 1509-1515, vol. QE-18 No. 10, IEEE.

Naganuma, K., "Dispersion Measurement Technique Application to Semiconductor Laser Cavities", NTT R&D, 1993, pp. 1049-1058, vol. 42 No. 8.

(Continued)

*Primary Examiner* — Tarifur Chowdhury
*Assistant Examiner* — Gordon Stock, Jr.
(74) *Attorney, Agent, or Firm* — McDermott Will & Emery LLP

(57) ABSTRACT

Highly accurate measurement of chromatic dispersions of a device under test that is an optical component is enabled with a simple structure comprising: propagating pump light having a wavelength $\lambda_{pump}$ and probe light having a wavelength λprobe through the device; calculating the generation efficiency of the idler light with respect to the wavelength $\lambda_{pump}$ by measuring the power of idler light having a wavelength $\lambda_{idler}$ output from the device according to four-wave mixing generated in the device; seeking the frequency difference or wavelength difference between the pump light and the probe light that makes an extremum of generation efficiency of the idler light; calculating phase mismatch among the pump light wavelength having such frequency difference or wavelength difference, the probe light wavelength, and the idler light wavelength; and on the basis of such calculation results, calculating the chromatic dispersion of the device at the wavelength $\lambda_{pump}$.

9 Claims, 6 Drawing Sheets

OTHER PUBLICATIONS

Hasegawa, T., et al., "High nonlinearity Bismuth fibers and their applications", OFC 2006, Paper OTuH5.

Mollenauer, L.F., et al., "Method for facile and accurate measurement of optical fiber dispersion maps", Optics Letters, Nov. 1996, vol. 21 No. 21, Optical Society of America.

Mussot, A., et al., "Zero-Dispersion Wavelength Mapping in Short Single-Mode Optical Fibers Using Parametric Amplification", IEEE Photonics Technology Letters, Jan. 2006, vol. 18 No. 1, IEEE.

Myslivets, E., et al., "High Resolution Measurement of Nearly Dispersionless Fiber by Localized Four Photon Mixing", *Proc. OFC/NFOEC 2008, PDP11*.

Auguié, B., et al., "Ultralow Chromatic Dispersion Measurement of Optical Fibers With a Tunable Fiber Laser", IEEE Photonics Technology Letters, Sep. 2006, pp. 1825-1827, vol. 18 No. 17.

Naganuma, K., "Measurements of Wavelength Dispersion and Ultrashort Light Pulse-Form Using Interferometric Correlation Techniques", Laser Study, 1995, pp. 55-66, vol. 23 No. 11.

Costa, B., et al., "Phase Shift Technique for the Measurement of Chromatic Dispersion in Optical Fibers Using LED's", IEEE Jpurnal of Quantum Electronics, Oct. 1982, pp. 1509-1515, vol. QE-18 No. 10, IEEE.

Naganuma, Naganuma, K., "Dispersion Measurement Technique Application to Semiconductor Laser Cavities", NTT R&D, 1993, pp. 1049-1058, vol. 42 No. 8.

Myslivets, E., et al., "High Resolution Measurement of Nearly Dispersionless Fiber by Localized Four Photon Mixing", IEEE Photon. Technol. Lett., Jan. 2006, pp. 22-24, vol. 18 No. 1.

US Office Action issued in U.S. Appl. No. 12/646,702 dated Mar. 29, 2012.

* cited by examiner

APPARATUS AND METHOD FOR MEASURING CHROMATIC DISPERSION

BACKGROUND OF THE INVENTION

1. Field of the Invention

The present invention relates to apparatus and methods for measuring chromatic dispersion.

2. Description of the Background Arts

It is known that the chromatic dispersion of an optical component causes broadening of an incident signal light pulse. Various methods have been examined for precisely measuring chromatic dispersions of optical components in order to evaluate them. Examples of methods for measuring chromatic dispersions of optical components include a time-of-flight method (L. G. Cohen and C. Lin: IEEE J. Quantum Electron. QE-14 (1978) No. 11, p. 855), a modulated signal phase shift method (B. Costa, et al.: IEEE J. Quantum Electron. QE-18 (1982) No. 10, p. 1509), and an interference method (Kazunori Naganuma: NTT R&D vol. 42 (1993) p. 1049). Moreover, a method of measuring the chromatic dispersion by means of four-wave mixing (FWM) is also studied (T. Hasegawa, et al.: OFC2006, paper OTuH5, 2006).

In recent years, much attention has been paid to researches on processing optical signals using FWM that occurs in a highly nonlinear fiber, and various applications are proposed. The highly nonlinear fiber is a fiber in which the efficiency of generating nonlinear phenomenon is enhanced, and in many cases, it is used as a device in which FWM is applied in a length having tens of meters to hundreds of meters.

In such applications, not only the chromatic dispersion (second-order dispersion) but also the higher-order dispersions including dispersion slope and the wavelength dependence of the dispersion slope are important parameters. It is desired that these parameters be considered in the performance evaluation of the highly nonlinear fiber. However, according to the above-mentioned methods of measuring the chromatic dispersion, it has been difficult to achieve a highly precise measurement with respect to the chromatic dispersions of optical components having a length of tens of meters to hundreds of meters. Further problem of such methods is that precisely measuring the chromatic dispersion requires a high-precision phase modulator and a light source having an extremely high degree of wavelength accuracy, for example, and hence a complicated structure.

SUMMARY OF THE INVENTION

The object of the present invention is to provide apparatus having a simple measurement set-up, as well as measuring methods, with which chromatic dispersion of a device under test that is an optical component can be measured with high accuracy.

To achieve the object, a chromatic dispersion measuring apparatus is provided. The chromatic dispersion measuring apparatus comprises: a pump light source for emitting pump light with a wavelength $\lambda_{pump}$; a probe light source for emitting probe light with a wavelength $\lambda_{probe}$; a measuring means for measuring the power of idler light having a wavelength $\lambda_{idler}$ that is output from a device under test according to four-wave mixing generated by propagation of the pump light and the probe light through the device; and an analysis tool for calculating a chromatic dispersion of the device at a specific wavelength $\lambda_{pump}$ by seeking the generation efficiency of idler light relative to the wavelength $\lambda_{probe}$ when the pump light having a specific wavelength is propagated and by seeking the frequency difference or wavelength difference between the pump light and the probe light that makes an extremum of generation efficiency of the idler light and calculating the phase mismatch among the pump light wavelength having such frequency difference or wavelength difference, the corresponding probe light wavelength, and the corresponding idler light wavelength in the device.

As another embodiment of the invention, a chromatic dispersion measuring method for calculating chromatic dispersions of a device under test is provided. The method comprises: propagating pump light having a specific wavelength $\lambda_{pump}$ and probe light having a wavelength $\lambda_{probe}$ through a device under test; seeking the generation efficiency of idler light with respect to the wavelength $\lambda_{pump}$ by measuring the power of the idler light having a wavelength $\lambda_{idler}$ that is output from the device according to four-wave mixing generated in the device; seeking the frequency difference or frequency difference or wavelength difference between the pump light and the probe light that makes the generation efficiency of the idler light an extremum; calculating the phase mismatch among the pump light wavelength having such frequency difference or wavelength difference, the corresponding probe light wavelength, and the corresponding idler light wavelength; and calculating, from such calculation results, a chromatic dispersion of the device at the specific wavelength $\lambda_{pump}$.

DETAILED DESCRIPTION OF THE INVENTION

The above-mentioned features and other features, aspects, and advantages of the present invention will be better understood through the following description, appended claims, and accompanying drawings. In the explanation of the drawings, an identical mark is applied to identical elements and an overlapping explanation will be omitted.

Chromatic Dispersion Measuring Apparatus

Figure 1:
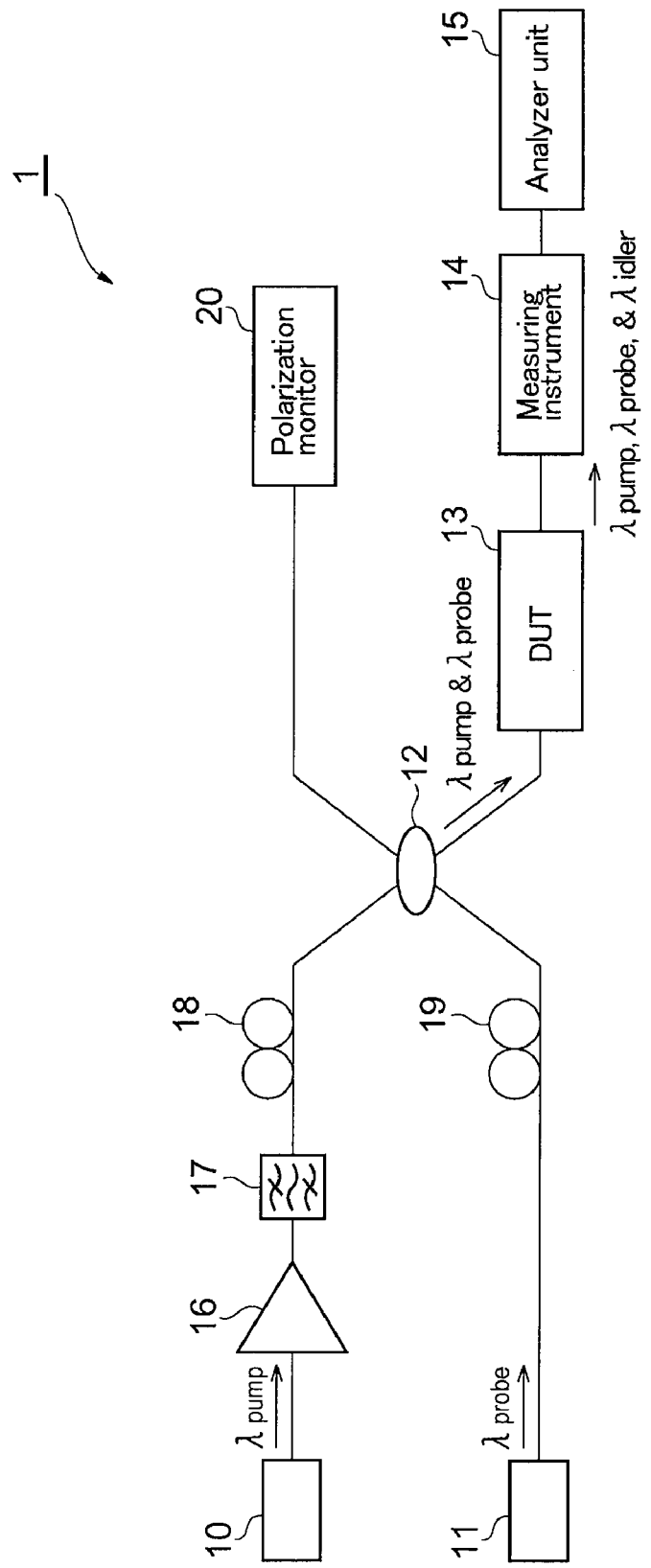
FIG. 1 is a conceptional schematic diagram of a chromatic dispersion measuring apparatus relating to an embodiment of the present invention.

FIG. 1 is a conceptional schematic diagram of a chromatic dispersion measuring apparatus 1 relating to an embodiment of the present invention. The chromatic dispersion measuring apparatus 1 comprises a pump light source 10, a probe light source 11, an optical coupler 12, a device under test (DUT) 13, a measuring instrument 14, an analyzer unit 15, an optical amplifier 16, a bandpass filter 17, polarization controllers 18 and 19, and a polarization monitor 20.

The pump light source 10 is a light source for outputting pump light with a wavelength $\lambda_{pump}$: a wavelength tunable light source capable of tunably outputting a single wavelength, or a wideband light source is suitably used therefor. The wavelength $\lambda_{pump}$ of the pump light that is incident on the DUT 13 is set to be different from the wavelength $\lambda_{probe}$ of the below-mentioned probe light. Also, it is preferable that the intensity of the pump light incident on the DUT 13 be sufficiently high to the extent that little nonlinear phenomenon other than FWM will occur, and the intensity will be set in the range of 10 mW to several W, for example.

The probe light source 11 is a light source for outputting probe light with a wavelength $\lambda_{probe}$, and a wideband light source or a wavelength tunable light source capable of tunably outputting a single wavelength is suitably used therefor. The wavelength of the probe light should be designed not to include the wavelength $\lambda_{pump}$ of the pump light at a time when the probe light is incident on the DUT 13. It is preferable that the intensity of the probe light incident on the DUT 13 be sufficiently high to the extent that little nonlinear phenomenon other than FWM will occur; however, it may be not so high as the intensity of the pump light. More specifically, the incident light intensity of the probe light is in the range of about 0.1 mW to several W.

When the probe light is made incident on the DUT 13, one or both of the pump light and the probe light consist of substantially a single wavelength. In such case, the probe light is preferably such that the ratio of the half width at half maximum is 0.5% or less relative to the central wavelength, for example, and the smaller this ratio, the better. The idler light having a wavelength $\lambda_{idler}$ is generated according to the four-wave mixing, i.e., a nonlinear optical phenomenon, which occurs in the DUT 13 as a result of the propagation of the pump light and the probe light.

Each of the following means is provided on the optical path of the pump light and the probe light so that they may be incident on the DUT 13. An amplifier 16 has a function to emit amplified light by amplifying the pump light that has been input thereinto from the pump light source 10. For the purpose of the amplifier 16, a Raman amplifier, an optical semiconductor amplifier (OSA), and a rare-earth ion doped optical amplifier (an erbium doped fiber amplifier (EDFA), a thulium doped fiber amplifier (TDFA), etc.) are preferably used. Here, the amplifier 16 is unnecessary in the case where the light intensity of the pump light output from the pump light source 10 is sufficiently high: more specifically, it will be sufficient if there is an output of several W to tens of mW.

The bandpass filter 17 has a function of allowing only the light having a frequency of necessary range to pass out of the pump light that has been output from the amplifier 16, and to attenuate the other light having a frequency of unnecessary range. It is preferable to provide the bandpass filter 17 when the optical noise from amplifier 16 is so significant as to make the detection of idler light difficult; however, it is not indispensable.

The polarization controllers 18 and 19 are provided for the purpose of arranging the status of polarization of the pump light and the probe light so as to coincide with each other. More specifically, the polarization controller 18 outputs the pump light to the optical coupler 12 after adjusting the polarization state of incident pump light. Also, the polarization controller 19 outputs the probe light to the optical coupler 12 after adjusting the polarization state of incident probe light. The polarization controllers 18 and 19 are not indispensable; however, it is preferable to provide them because the output power of the idler light becomes stronger when the states of polarization of the pump light and the probe light are arranged to coincide with each other. It is unnecessary to provide the polarization controllers 18 and 19 in the case where either one or both of the states of polarization of the probe light and the pump light are scrambled to make the states of polarization random.

The optical coupler 12 is provided to combine the pump light and the probe light so as to make them incident on the DUT 13 at the same time. The pump light and the probe light may be made incident on the DUT 13 using a spatial optical system such as lens or the like instead of using the optical coupler 12. If necessary, the polarization monitor 20 is provided downstream of the optical coupler 12 in an arm different from the DUT 13 so as to confirm whether the states of polarization of the pump light and the probe light are coincident.

The measuring instrument 14 is a measuring means for measuring the output power of the idler light that is output from the DUT 13 according to four-wave mixing generated by propagation of the pump light and the probe light through the DUT 13. More specifically, the measuring instrument 14 is constituted by an optical spectrum analyzer (OSA), or a combination of a monochromator for picking up only the idler light wavelength that is the measurement target, and a photodetector such as an optical calorimeter. Also, the measuring instrument 14 may have a function of calculating the incident light intensities of the pump light and the probe light that are incident on the DUT 13 by simultaneously monitoring the output light intensities of the pump light and the probe light that are output therefrom.

The analyzer unit 15 is an analysis tool for calculating the chromatic dispersion of the DUT 13 according to the output intensities of idler light as measured by the measuring instrument 14. The manner of calculating the chromatic dispersion by the analysis tool will be described later.

The Method of Measuring the Chromatic Dispersion

An n-th order derivative of the mode-propagation constant $\beta$ in the DUT 13 is written as Equation (1):

$$\beta_n = d^n\beta/d\omega^n \tag{1}$$

The second order dispersion ($\beta_2$) is calculated by making "n=2" in Equation (1). Also, the chromatic dispersion (Disp), dispersion slope (Slope), wavelength dependence (dS/dλ) of the dispersion slope, which are used in the optical communication, are calculated by Equations (2), (3), and (4), respectively:

$$Disp = d(\beta_1)/d\lambda \tag{2}$$

$$Slope = d^2(\beta_1)/d\lambda^2 \tag{3, and}$$

$$dS/d\lambda = d^3(\beta_1)/d\lambda^3 \tag{4}$$

In Equations (2), (3), and (4), λ is a wavelength, and has the relationship shown by Equation (5) with respect to angular frequency ω:

$$\omega = 2\pi C/\lambda \tag{5}$$

where C represents a speed of light in the vacuum.

Here, the frequency $\omega_{idler}$ of the idler light that occurs according to degenerate four-wave mixing, which is a kind of nonlinear optical phenomenon, satisfies the relation to the frequency $\omega_{pump}$ of the pump light and the frequency $\omega_{probe}$ of the probe light expressed by Equation (6):

$$2\omega_{pump} - \omega_{probe} - \omega_{idler} = 0 \tag{6}$$

Also, the generation efficiency of the idler light, that is, $$\frac{P_{idler}}{P_{probe}P_{idler}^2},$$

(wherein $P_{idler}$ is a power of the idler light output from the DUT 13, $P_{probe}$ probe is a power of the probe light incident to the DUT 13, and $P_{pump}$ is a power of the pump light incident to the DUT 13) can be written as Equation (7):

$$\frac{P_{idler}}{P_{probe}P_{pump}^2} = (\gamma \cdot Leff)^2 \exp(-\alpha_{linear} \cdot L) \cdot \eta, \quad (7)$$

wherein, γ is a nonlinear coefficient of the DUT 13, Leff is an effective length of the DUT 13, $\alpha_{linear}$ is a linear transmission loss of the DUT 13, L is a length of the DUT 13, and η is a phase matching parameter.

Here, the nonlinear coefficient γ is calculated by the formula (8):

$$\gamma = \frac{2\pi}{\lambda} \cdot \frac{n_2}{Aeff}, \quad (8)$$

where $n_2$ represents a third order nonlinear refractive index, and Aeff represents an effective area. Also, the effective length Leff is calculated by a formula (9):

$$Leff = \frac{1 - \exp(-\alpha_{linear}L)}{\alpha_{linear}}. \quad (9)$$

The linear transmission loss $\alpha_{linear}$ satisfies the relationship $\alpha_{linear} = \alpha/4.343$ with respect to the transmission loss a as indicated in terms of dB.

Assuming that there is no wavelength dependence of nonlinear coefficient γ and linear transmission loss $\alpha_{linear}$, the parameters γ, $\alpha_{linear}$, Leff, L, and $P_{pump}$, which are included in Equation (7), are values determined by the characteristics of the DUT 13 and the experiment conditions and can be treated as coefficients. On the other hand, the phase matching parameter η can be written as Equation (10):

$$\eta = \frac{1}{\alpha_{linear}^2 + \Delta\beta^2}\left(\alpha_{linear}^2 + \frac{4\exp(-\alpha_{linear} \cdot L) \cdot \sin^2(\Delta\beta L/2)}{Leff^2}\right), \quad (10)$$

wherein $\Delta\beta = 2 \times \beta(\omega_{pump}) - \beta(\omega_{probe}) - \beta(\omega_{idler})$, and $\beta(\omega_{pump})$, $\beta(\omega_{probe})$, and $\beta(\omega_{idler})$ represent propagation constant β in pump light frequency, probe light frequency, and idler light frequency respectively. Under the condition of phase matching ($\Delta\beta=0$), the phase matching parameter η has a peak value (maximum) η=1.

Here, if the DUT 13 is a silica-based optical fiber, for example, $\alpha_{linear}^2$ can be ignored, since it is such a small value as on the order of $10^{-4}$/m. Thus, in this case, Equation (10) can be rewritten with Equation (11):

$$\eta \approx \frac{1}{\Delta\beta^2}\left(\frac{4\exp(-\alpha_{linear} \cdot L) \cdot \sin^2(\Delta\beta L/2)}{Leff^2}\right) = \frac{L^2 \cdot \exp(-\alpha_{linear} \cdot L)}{Leff^2}\left(\frac{\sin(\Delta\beta L/2)}{\Delta\beta L/2}\right)^2. \quad (11)$$

Therefore, the generation efficiency of the idler light shown by Equation (7) becomes an oscillating function having maximal and minimal values according to $$\left\{\frac{\sin(\Delta\beta L/2)}{\Delta\beta L/2}\right\}^2.$$

If the Equation (11) is differentiated with respect to X, which is defined as shown by Equation (12):

$$X = \Delta\beta L/2 \quad (12),$$

such differentiation results in Equation (13):

$$\frac{d\eta}{dX} = \frac{2L^2 \cdot \exp(-\alpha_{linear} \cdot L)}{Leff^2} X^{-3}\{\sin(X)\}\{-\sin(X) + X\cos(X)\}. \quad (13)$$

When the relation shown in Equation (14):

$$\sin(X) = 0 \quad (14),$$

is satisfied, the phase matching parameter η has a minimal value (in the case of X≠0). When the relation shown in Equation (15):

$$-\sin(X) + X\cos(X) = 0 \quad (15),$$

is satisfied, η has a maximal value.

According to Equations (13) and (14), the conditions for having a minimal value are as shown in Equations (16):

$$X = \Delta\beta L/2 = N\pi$$

$$\Delta\beta = 2N\pi/L, N = \ldots -3, -2, -1, +1, +2, +3, \quad (16).$$

Also, according to Equations (13) and (15), the condition for having a maximal value is as shown in Equation (17):

$$-\sin(\Delta\beta L/2) + \Delta\beta L/2 \cos(\Delta\beta L/2) = 0 \quad (17).$$

The Δβ that makes η maximal, in the case of having a large value such as "$\Delta\beta L/2 > 10\pi$" (N= ... −7, −6, −5, 5, 6, 7 ...), can be approximated with Equation (18):

$$\Delta\beta \approx (2N+1)\pi/L \quad (18).$$

Here, if a Taylor expansion is made in a neighborhood of the pump light frequency $\omega_{pump}$ and the relationship of Equation (6) is used, the phase mismatch Δβ can be expanded with the following Equation (19):

$$\Delta\beta = -\beta_{2\_p} \cdot (\omega_{probe} - \omega_{pump})^2 - 1/12 \beta_{4\_p} \cdot (\omega_{probe} - \omega_{pump})^4 - 1/360 \beta_{6\_p} \cdot (\omega_{probe} - \omega_{pump})^6 \quad (19).$$

In Equation (19), $\beta_{n\_p}$ represents $\beta_n$ at the pump light frequency. Equation (19) can make Equation (20), ignoring fourth-order differential $\beta_4$ and the following higher-order differentials, except for the local extreme value of the generation efficiency of the idler light existing in the vicinity of phase matching where the second-order differential $\beta_2$ is very small and the pump light frequency is close to zero-dispersion frequency:

$$\Delta\beta = -\beta_{2\_p} \cdot (\omega_{probe} - \omega_{pump})^2 \quad (20).$$

Here, if $\beta_{2\_p}$ is subjected to a Taylor expansion to the extent of sixth order in a neighborhood of the zero-dispersion frequency $\omega_z$ where "$\beta_2 = 0$" holds, the $\beta_{2\_p}$ is expressed by Equation (21):

$$\beta_{2\_p} = -\beta_{3\_z} \cdot (\omega_{pump} - \omega_z) + 1/2 \beta_{4\_z} \cdot (\omega_{pump} - \omega_z)^2 - 1/6 \beta_{5\_z} \cdot (\omega_{pump} - \omega_z)^3 + 1/24 \beta_{6\_z} \cdot (\omega_{pump} - \omega_z)^4 \quad (21),$$

where $\beta_{n\_z}$ is $\beta_n$ at the zero-dispersion frequency $\omega_z$. When $\beta_5$ and $\beta_6$ are sufficiently small, by substituting Equation (21) in Equation (19), and using the relations of $\beta_{4\_p} = \beta_{4\_z}$, Equation (22) can be made:

$$\Delta\beta = -1/2 \beta_{4\_z} \cdot (\omega_{probe} - \omega_{pump})^2 \cdot \omega_{pump}^2 - (\beta_{3\_z} - \omega_0 \beta_{4\_z}) \cdot (\omega_{probe} - \omega_{pump})^2 \cdot \omega_{pump} - (-\omega_0 \beta_{3\_z} + 1/2 \omega_0^2 \beta_{4\_z}) \cdot (\omega_{probe} - \omega_{pump})^2 - 1/12 \beta_{4\_z} \cdot (\omega_{probe} - \omega_{pump})^4 \quad (22).$$

Also, Equation (23) can be made by substituting Equation (21) in Equation (20):

$$\Delta\beta/(\omega_{probe}-\omega_{pump})^2 = \beta_{3\_z'}(\omega_{pump}-\omega_z) + \frac{1}{2}\beta_{4\_z'}(\omega_{pump}-\omega_z)^2 + \frac{1}{6}\beta_{5\_z'}(\omega_{pump}-\omega_z)^3 + \frac{1}{24}\beta_{6\_z'}(\omega_{pump}-\omega_z)^4 \quad (23).$$

Particularly, in the case of a fiber in which the zero dispersion wavelength does not exist near the wavelength $\lambda_{pump}$ and $\beta_2$ is large, $\Delta\beta$ can be expressed by Equation (20), and therefore Equation (12) can be rewritten with Equation (24):

$$X = -\beta_{2\_p} \times \Delta\omega^2 \times L/2 \quad (24).$$

Here, if $\Delta\omega^2$ is altered without changing the pump light wavelength (i.e., with $\beta_{2\_p}$ as a constant value), X depends solely on $\Delta\omega^2$. Therefore, when the $\Delta\omega^2$ dependence of the FWM generation efficiency as shown in Equation (7) is put into consideration, the FWM generation efficiency becomes a minimal value and a maximal value under the conditions shown in Equations (16) and (17), respectively. More specifically, as to the minimal value for example, Equation (16) can be changed into Equation (25):

$$\beta_{2\_p} \times \Delta\omega^2 \times L/2 = N\pi, N = \ldots -3, -2, -1, +1, +2, +3, \quad (25).$$

According to Equation (25), the difference between the reciprocal of adjacent values of $\Delta\omega^2$ for making a minimal value of FWM generation efficiency is $\beta_{2\_p} \times L/(2\pi)$, which makes it possible to obtain $\beta_2$ at the pump light frequency. Similarly, using the periodic relationship of $\Delta\omega^2$ that makes a maximal value, it is also possible to obtain $\beta_2$ at the pump light frequency from the relationship of Equation (17).

Figure 2:
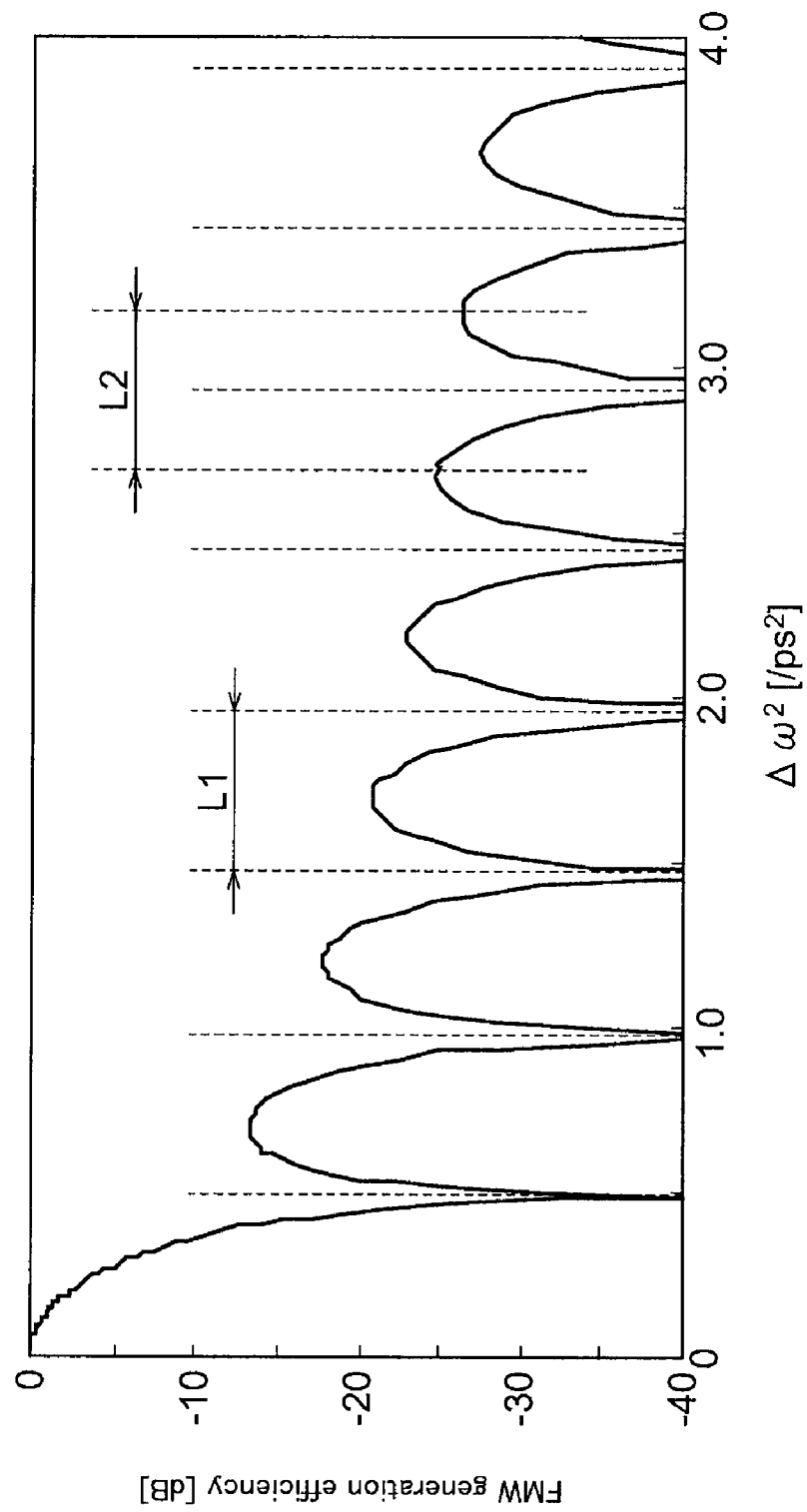
FIG. 2 is a graph showing the $\Delta\omega^2$ dependence of FWM generation efficiency.

FIG. 2 is a graph showing the $\Delta\omega^2$ dependence of the FWM efficiency. Difference L1 is an example of the difference of adjacent minimal values. Also, Difference L2 is an example of the difference of adjacent maximal values. The reciprocal of L1 and L2 becomes "$\beta_{2\_p} \times L/(2\pi)$", and using this, it is possible to obtain $\beta_2$ at the pump light frequency. Also, the wavelength dependence of $\beta_2$ can be measured by conducting a similar measurement while changing the pump light frequency, and furthermore it is possible to obtain high-order dispersions such as a third-order dispersion $\beta_3$ at the wavelength $\lambda_{pump}$ of the device under test and a fourth-order dispersion $\beta_4$ at the wavelength $\lambda_{pump}$ of the device. Since it is sufficient if the period of the relationship on $\Delta\omega^2$ is found, it is theoretically possible to measure dispersions regardless of $\beta_2$.

In the above-mentioned invention relating to the chromatic dispersion measurement, the angular frequency $\omega$ is used; however, it is also possible to use wavelength $\lambda$ for the calculation of the chromatic dispersion by using the relationship of $\omega = 2\pi C/\lambda$. Also, it is sufficient if $\lambda_{pump}$ is a substantially constant value (the difference at the time of measurement is ±1% or less). In such case, the calculation of phase mismatch $\Delta\beta$ is possible from the relationship of Equation (5), and also by using the relationship of Equations (1) to (4), etc, it is possible to convert an n-th order dispersion $\beta_n$ into a chromatic dispersion parameter $d^{n-1}(\beta_1)/d\lambda^{n-1} (n \geq 2)$, which is generally used in fiber optics.

EXAMPLE

Figure 3:
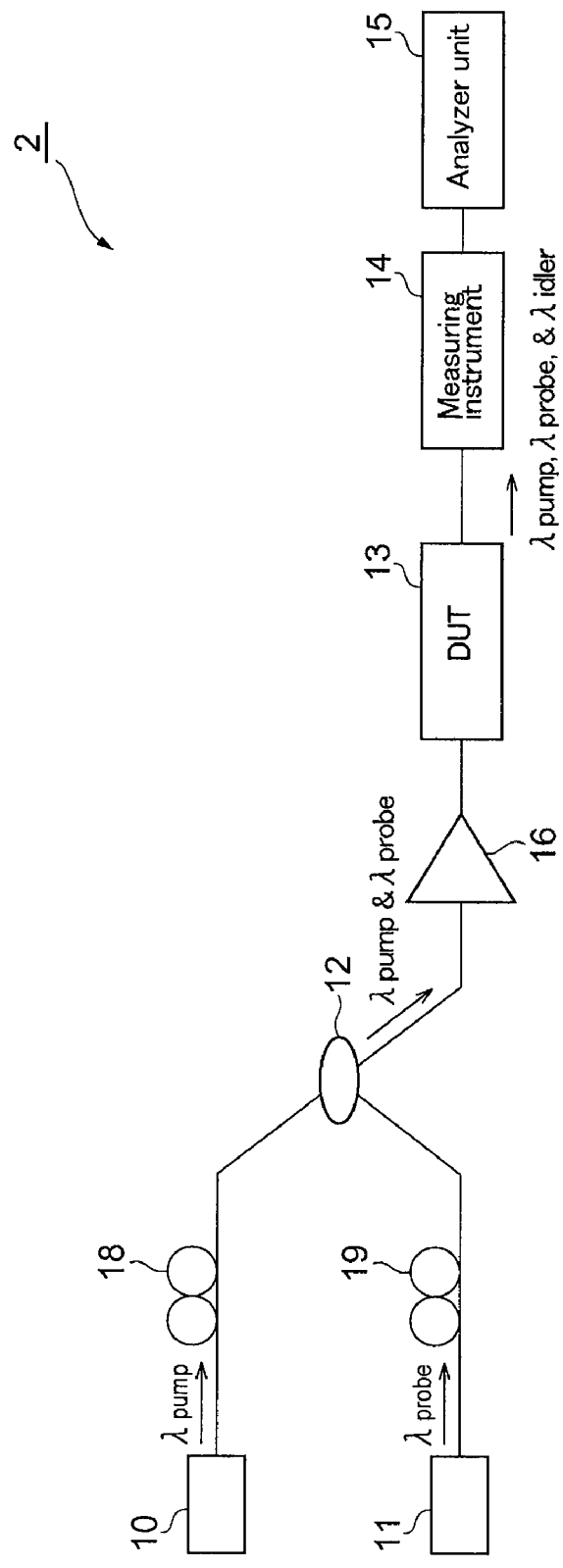
FIG. 3 is a conceptional schematic diagram of a chromatic dispersion measuring apparatus relating to another embodiment of the present invention.

FIG. 3 is a conceptional schematic diagram of a chromatic dispersion measuring apparatus 2 relating to another embodiment of the present invention. Chromatic dispersions of an optical fiber as a DUT 13 were measured using the chromatic dispersion measuring apparatus 2. The compositions of equipment included in the chromatic dispersion measuring apparatus 2 are as described in the following.

Wavelength-tunable LD light sources were used as a pump light source 10 and a probe light source 11. The half width at half maximum of these light sources was 0.1 nm or less. The wavelength $\lambda_{pump}$ of the pump light was set to 1530, 1550, 1570, 1590, and 1610 nm, and in each of such cases the wavelength $\lambda_{probe}$ of the probe light was tuned at 0.1 nm intervals in the range of $\lambda_{pump}+5$ nm to $\lambda_{pump}+13$ nm. Here, using polarization controllers 18 and 19 which were arranged on the respective optical paths of the pump light and the probe light, the states of polarization of the pump light and the probe light that were put into the optical fiber 13 are aligned to be coincide with each other. A 3-dB optical coupler was used as the optical coupler 12.

These pump light and probe light were amplified with the amplifier 16 after being combined by the optical coupler 12. An EDFA was used as the amplifier 16, and the pump light and the probe light were amplified to a range of +10 to +16 dBm. Here, when the wavelength $\lambda_{pump}$ of the pump light was 1530 to 1550 nm, an EDFA for C-band was used and when the wavelength $\lambda_{pump}$ of the pump light was 1570 to 1610 nm, an EDFA for L-band was used.

As to the measuring instrument 14, the intensities of the pump light, the probe light and the idler light were measured using an optical spectrum analyzer (OSA). Using such measurement results, the transmission loss of the optical fiber, and the coupling loss relating to the optical fiber and the OSA, the respective incident intensities of the pump light and the probe light incident onto the optical fiber were calculated. The output power of the idler light was calculated on the basis of the optical coupling loss relating to the optical fiber and the OSA. The conversion efficiencies of the idler light were obtained using Equation (7), and the so-called efficiencies were changed into normalized values (normalized conversion efficiencies) relative to the maximum value of the efficiency.

Figure 4:
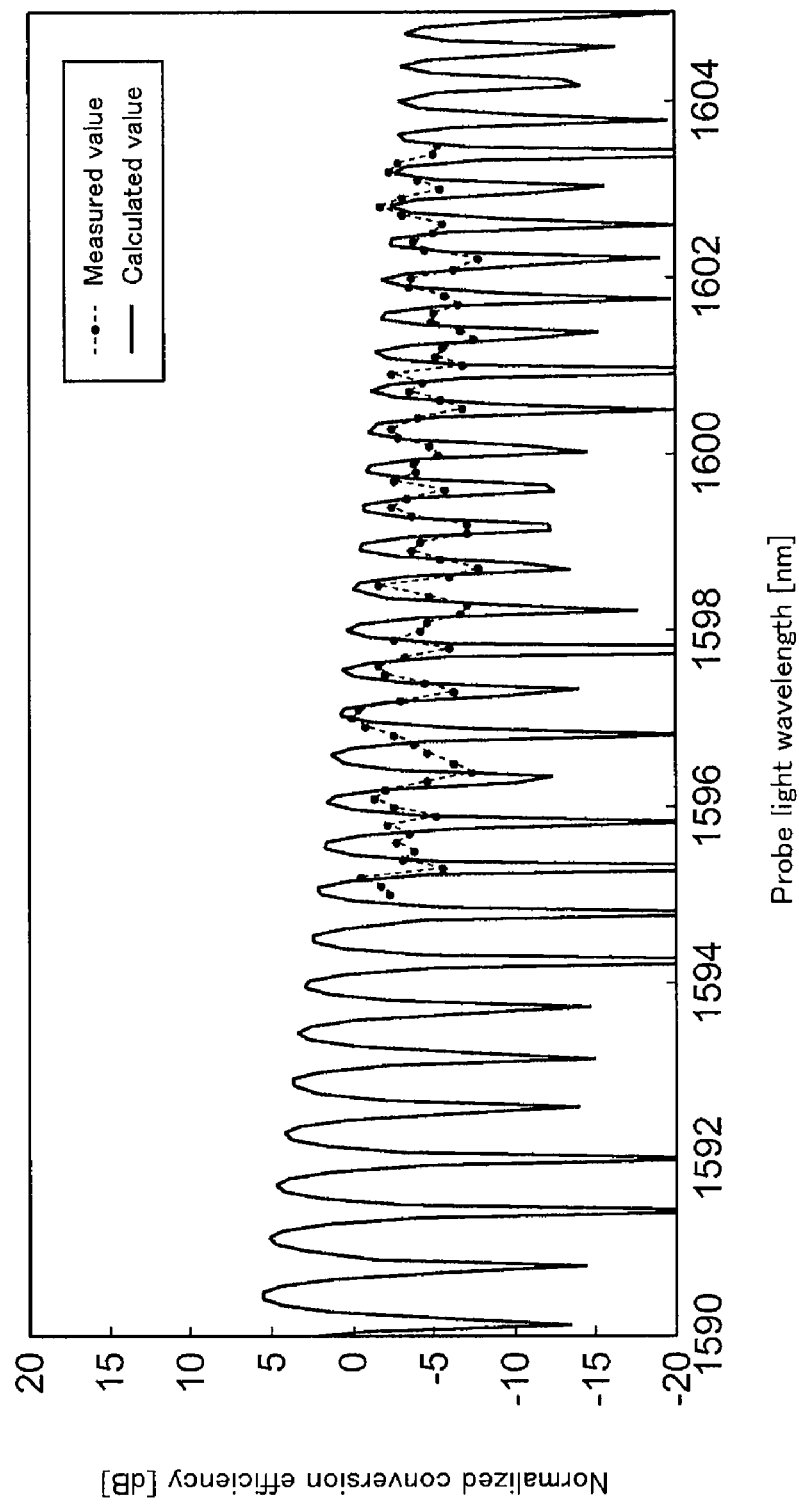
FIG. 4 is a graph plotting normalized conversion efficiencies relative to the probe light wavelength $\lambda_{probe}$.

FIG. 4 is a graph plotting normalized conversion efficiencies relative to the probe light wavelength $\lambda_{probe}$ in the case where an optical fiber having the characteristics shown in Table I was used as the DUT 13 and the pump light wavelength was fixed at 1570 nm.

TABLE I

| Item | Value |
| --- | --- |
| Transmission loss @1.55 μm | 0.50 dB/km (0.12/km) |
| Aeff | 10 μm$^2$ |
| Polarization mode dispersion | 0.02 ps/√km |
| Cutoff wavelength | 1350 nm |
| Length | 23 m |
| Nonlinear coefficient | 21/w/km |

Figure 5:
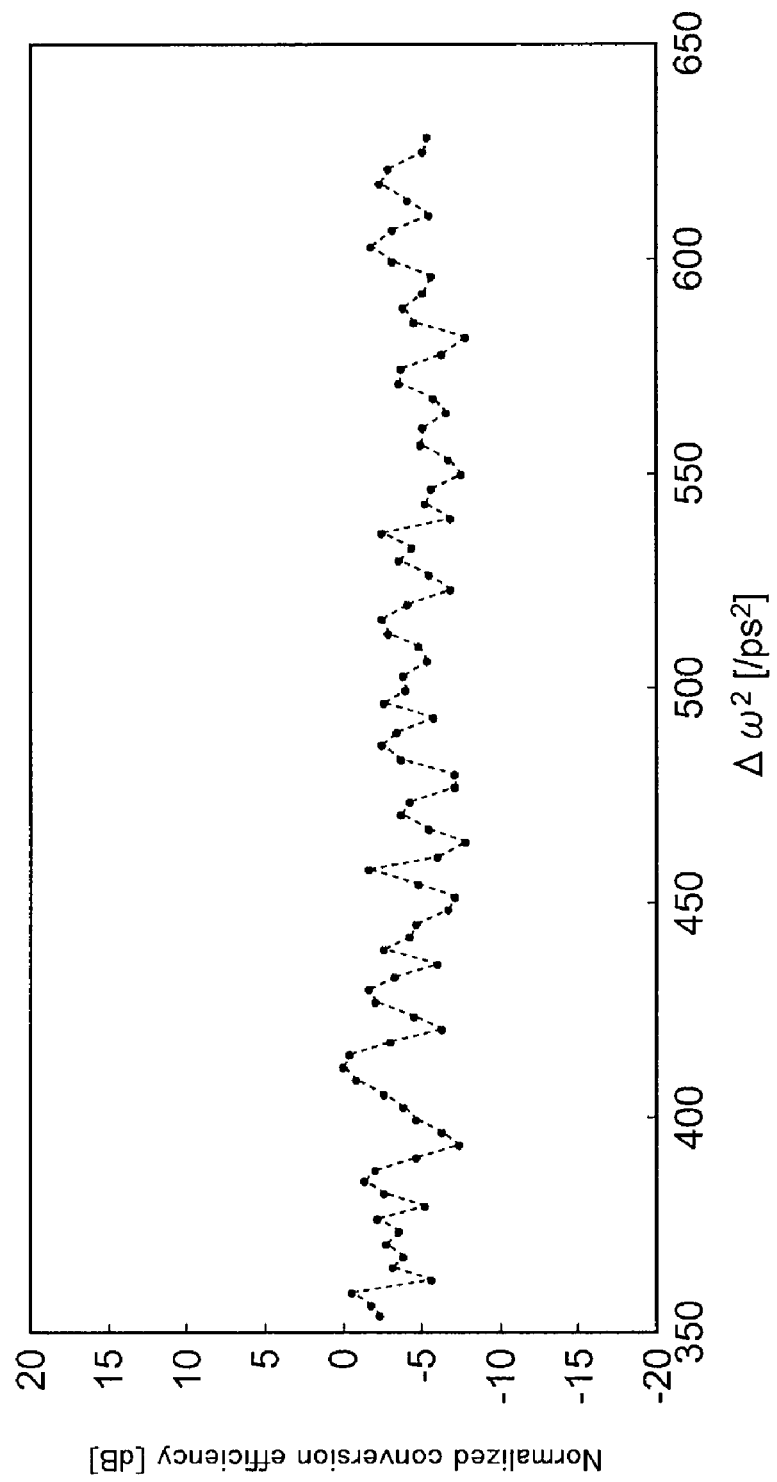
FIG. 5 is a graph showing the $\Delta\omega^2$ dependence of the normalized conversion efficiency.

Moreover, using the relationship of $\omega = 2\pi C/\lambda$ shown in Equation (5), $\Delta\omega^2 = (\omega_{pump} - \omega_{probe})^2$ was calculated and the relationship between the normalized conversion efficiency and $\Delta\omega^2$ was obtained. FIG. 5 is a graph showing the $\Delta\omega^2$ dependence of the normalized conversion efficiency. The normalized conversion efficiency exhibited definite periodic characteristics and it was confirmed that an extremum appeared at every $\Delta\omega^2 = 14.7$ ps$^{-2}$. Consequently, at the pump light wavelength of 1570 nm, it was possible to calculate $\beta_2 = 2\pi/(0.026 \times 14.7) = 16.5$ ps$^2$/km from Equation (25) and to obtain Disp = −12.6 ps/nm/km.

The solid line of FIG. 4 shows calculation values of the normalized conversion efficiency that were obtained using the calculation values of $\beta_2$. It is seen that the calculation values of the normalized conversion efficiency are well coincident with the measurement values.

Figure 6:
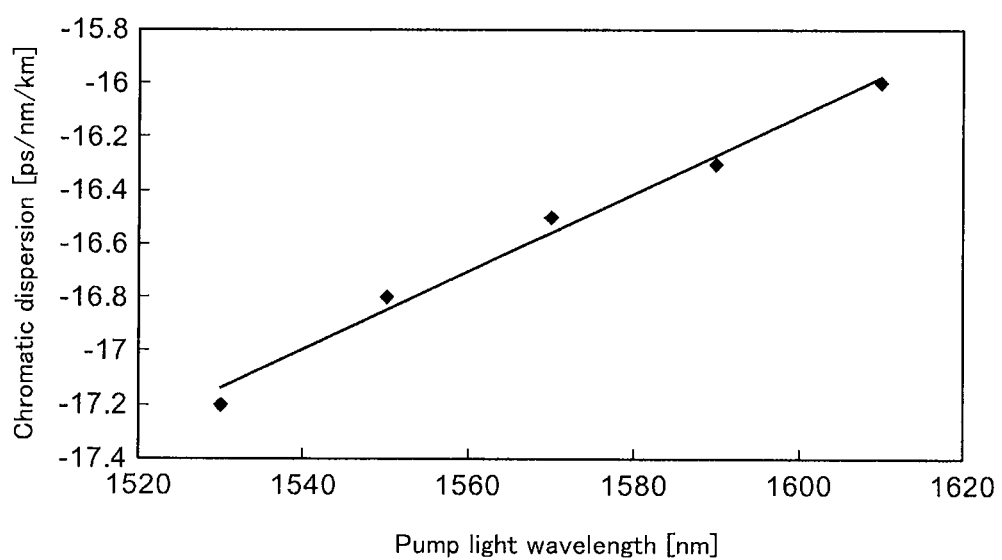
FIG. 6 shows the pump light wavelength dependence of chromatic dispersion (Disp).

FIG. 6 is a graph plotting, relative to the pump light wavelength, the chromatic dispersion (Disp) obtained at each wavelength as in the above-mentioned analysis. The chromatic dispersions (Disp) at 1530, 1550, 1570, 1590, and 1610 nm were −17.2 ps/nm/km, −16.8 ps/nm/km, −16.5 ps/nm/km, −16.3 ps/nm/km, and −16.0 ps/nm/km, respectively. The solid line is a straight line linearly approximated using the least squares method. From the inclination of the solid line, it was possible to calculate that the dispersion slope of the optical fiber was +0.015 ps/nm$^2$/km.

According to the chromatic dispersion measuring method of the present invention, if the power of the pump light wavelength increases by twice (3 dB), then the same conversion efficiency can be obtained even if the fiber length is ½. For example, it is possible to measure the chromatic dispersion of a fiber having a length of 10 m or less (e.g., several m).

Also, according to the present invention, special equipment such as a streak camera or modulator is not needed, and it is possible to measure the dispersion value in such a wavelength band as 1-μm band or 2-μm band, for example, which is not generally used for optical communication. Moreover, it is unnecessary to provide a reference light path or a mechanism for causing a delay time, and it is possible to measure the chromatic dispersion of a device under test, i.e., an optical component, such as a dispersion shifted fiber having a length in a range of several m to hundreds of m, for example, with high precision using a simple equipment structure without performing a numerical simulation.

While this invention has been described in connection with what is presently considered to be the most practical and preferred embodiments, the invention is not limited to the disclosed embodiments, but on the contrary, is intended to cover various modifications and equivalent arrangements included within the spirit and scope of the appended claims.

For example, the pump light source is preferably a wavelength-tunable light source. In such case, the analysis tool calculates, in a plurality of wavelengths of the pump light, phase mismatches among the probe light wavelength, the idle light wavelength, and the pump light wavelength that makes an extremum of the generation efficiency, and calculates the chromatic dispersion at each wavelength of the pump light. Also, it is preferable that the wavelength $\lambda_{pump}$ be different from the zero-dispersion wavelength of the device under test.

In the embodiment of the above-mentioned Example, it is also possible to obtain a chromatic dispersion value at a specific position of the optical fiber by making the pump light and the probe light to be pulsed light. In such case, the position at which the pump light and the probe light collide with each other is controlled by adjusting the difference in the timing of their incidence on different end faces of the optical fiber. By finding the $\omega^2$ dependence of power of the idler light that is output as a result of correlation caused between the pump light and the probe light at the specific position of the optical fiber, the analysis tool can calculate the chromatic dispersion characteristics at such colliding position in the fiber.

In the above-mentioned case, it is advantageous to narrow the pulse width of the pump light and the probe light, for example, since it enables high positional resolution. In that case, however, the conversion efficiency of the idler light in Equation (7) becomes lower. On the other hand, if the pulse widths of the pump light and the probe light are broadened, the correlation length of the pump light and the probe light becomes longer, resulting in higher conversion efficiency of the idler light; however, the positional resolution becomes lower. Therefore, it is preferable to choose the pulse width of the pump light and the probe light appropriately depending on the measurement conditions.

For example, when the pulse width is 0.5 ns, the correlation length of the pump light and the probe light is about 0.1 m. Similarly, when the pulse width is 5 ns, the correlation length is about 1 m. When the pulse width is 500 ns, the correlation length is about 100 m, and when the pulse width is 1000 ns, the correlation length is about 200 m. If the DUT 13 is an optical fiber, it is preferable to set the pulse width in the range of 0.5 to 1000 ns.

Hereinafter, the chromatic dispersion measuring apparatus and method of the present invention will be explained in comparison with conventional chromatic dispersion measuring techniques. The method of L. F. Mollenauer, et al.: in Opt. Lett. vol. 21 (1996) p. 1724 is such that FWM light from two pulsed light waves having wavelengths that are distanced from each other are measured with the optical time domain reflectometry (OTDR) method, so that a dispersion value in the longitudinal direction is obtained from the instantaneous frequency. However, this method suffers from a significant measurement error because it relies on an instantaneous frequency while a significant dead zone exists in the incident end portion and the positional resolution is about 100 m or more.

The method of A. Mussot, et al., described in IEEE Photon. Technol. Lett.: Vol. 18 (2006) p. 22 required a complicated numerical simulation and the analysis was not easy. Also, according to the method of E. Myslivets, et al,: Proc. OFC/NFOEC2008, PDP11, 2008, it is possible to seek a highly accurate dispersion value with high resolution, but it is necessary to provide a light source that is locked to the Brillouin shift frequency of a fiber, resulting in inevitably complicated and expensive equipment.

In contrast, the chromatic dispersion measuring apparatus and method of the present invention exhibit advantageous effect that the chromatic dispersion can be measured with high precision, without using a numerical simulation, or the like, and that the realization of such high precision measurement does not require expensive equipment compositions.

In the chromatic dispersion measuring method of the present invention, although the wavelength dispersion (or $\beta_2$) of an optical fiber should be uniform, it is easy to obtain a uniform wavelength dispersion (for example, distribution with a variation of ±5% or less) since the length of the optical fiber for which high precision measurement of the zero-dispersion wavelength or high-order dispersion is needed is as short as 1 km or less. That is, the chromatic dispersion measuring method of the invention can suitably be used for an optical fiber having a length of several m to about 1 km.

The lower the polarization mode dispersion (PMD) of the DUT 13, the better; however, when the DUT 13 is an optical fiber, it is possible to accomplish the measurement if PMD is 0.5 ps or less in the full length of the fiber. As for the cutoff wavelength, the conventional method has required single-mode propagation at the measurement wavelength; however, in the method of the invention, the high mode in which the zero-dispersion wavelength is not in the vicinity of the measurement range does not satisfy the relationship of Equation (19), and therefore it does not become a noise factor. Since the nonlinear phenomenon is used, the higher the nonlinear coefficient of the fiber, the easier the measurement. However, even in the case of a low nonlinear coefficient, the measurement can be accomplished by increasing the pump light intensity. For example, it is also possible to measure the chromatic dispersion of a standard single-mode fiber having a nonlinear coefficient $\gamma$ of 2/W/km.

What is claimed is:

1. A chromatic dispersion measuring apparatus comprising:
   a pump light source for emitting pump light with a wavelength $\lambda_{pump}$;
   a probe light source for emitting probe light with a wavelength $\lambda_{probe}$;
   a measuring means for measuring a power of idler light having a wavelength $\lambda_{idler}$ output from a device under test according to four-wave mixing generated by propagation of the pump light and the probe light through the device under test; and
   an analysis tool for calculating the chromatic dispersion of the device at a specific wavelength $\lambda_{pump}$ on the basis of results obtained by seeking a generation efficiency of idler light relative to the wavelength $\lambda_{probe}$ when the pump light having a specific wavelength is propagated and by detecting a frequency difference or wavelength difference between the pump light and the probe light that makes an extremum of generation efficiency of the idler light and by calculating a phase mismatch among the pump light wavelength having such frequency difference or wavelength difference, the corresponding probe light wavelength, and the corresponding idler light wavelength in the device under test.

2. A chromatic dispersion measuring apparatus according to claim 1, wherein the pump light source is a wavelength-tunable light source, and the analysis tool calculates phase mismatch among the pump light wavelength, the probe light wavelength, and the idler light wavelength at each wavelength in the case of a plurality of wavelengths being output from the pump light source, and from such calculation results, calculates respective chromatic dispersions of the device under test in the plurality of wavelengths of the pump light.

3. A chromatic dispersion measuring apparatus according to claim 1, wherein the wavelength $\lambda_{pump}$ is different from the zero-dispersion wavelength of the device under test.

4. A chromatic dispersion measuring apparatus according to claim 1, wherein the idler light is output from the device under test in a forward direction of the pump light.

5. A chromatic dispersion measuring method for calculating the chromatic dispersion of a device under test at a specific wavelength $\lambda_{pump}$ comprising:
   propagating pump light having a wavelength $\lambda_{pump}$ and probe light having a wavelength $\lambda_{probe}$ through a device under test;
   seeking a generation efficiency of an idler light with respect to the wavelength $\lambda_{pump}$ by measuring a power of idler light having a wavelength $\lambda_{idler}$ output from the device under test according to four-wave mixing generated in the device under test;
   seeking a frequency difference or wavelength difference between the pump light and the probe light that makes an extremum of generation efficiency of the idler light;
   calculating a phase mismatch among the pump light wavelength having such frequency difference or wavelength difference, the corresponding probe light wavelength, and the corresponding idler light wavelength; and
   calculating the chromatic dispersion of the device under test from such calculation results.

6. A chromatic dispersion measuring method according to claim 5, further comprising causing the wavelength $\lambda_{pump}$ to be different from a zero-dispersion wavelength of the device under test.

7. A chromatic dispersion measuring method according to claim 5, further comprising calculating a third-order dispersion at the wavelength $\lambda_{pump}$ of the device under test.

8. A chromatic dispersion measuring method according to claim 5, further comprising calculating a fourth-order dispersion at the wavelength $\lambda_{pump}$ of the device under test.

9. A chromatic dispersion measuring method according to claim 5, wherein the idler light is output from the device under test in a forward direction of the pump light.

* * * * *